(12) United States Patent
Yen (10) Patent No.: US 7,044,757 B1
(45) Date of Patent: May 16, 2006

(54) UNIVERSAL MEMORY CARD ADAPTER HAVING A MOVABLE DOOR

(75) Inventor: Ming-Hui Yen, Taipei Hsien (TW)

(73) Assignee: Chant Sincere Co., Ltd., (TW)

( * ) Notice: Subject to any disclaimer, the term of this patent is extended or adjusted under 35 U.S.C. 154(b) by 0 days.

(21) Appl. No.: 11/126,222

(22) Filed: May 11, 2005

(51) Int. Cl.
*H01R 13/44* (2006.01)

(52) U.S. Cl. .................................... 439/138

(58) Field of Classification Search ............... 439/660, 439/630, 138
See application file for complete search history.

(56) References Cited

U.S. PATENT DOCUMENTS

| | | | | |
|---|---|---|---|---|
| 6,368,122 B1 * | 4/2002 | Billman | ...................... | 439/138 |
| 6,595,696 B1 * | 7/2003 | Zellak | ...................... | 385/72 |
| 6,717,805 B1 * | 4/2004 | Liu et al. | ...................... | 361/684 |
| 6,828,756 B1 * | 12/2004 | Kinoshita | ...................... | 320/114 |
| 6,840,680 B1 * | 1/2005 | Chiu et al. | ...................... | 385/53 |
| 6,863,571 B1 * | 3/2005 | Sato et al. | ...................... | 439/630 |
| 6,887,087 B1 * | 5/2005 | Lai et al. | ...................... | 439/138 |
| 6,896,555 B1 * | 5/2005 | Su et al. | ...................... | 439/630 |

* cited by examiner

*Primary Examiner*—Tulsidas C. Patel
*Assistant Examiner*—Harshad C Patel
(74) *Attorney, Agent, or Firm*—Bacon & Thomas PLLC (57) ABSTRACT

A universal memory card adapter is disclosed to have a movable door horizontally pivotally mounted in a stepped receiving open side thereof to control insertion of different memory cards, which movable door has a doorplate pivotally mounted in the stepped receiving open side and dividing the stepped receiving open side into an open type insertion slot and a sheltered insertion slot to match the insertion of different memory cards, a spring member for holding the doorplate in a normal close position, and a control spring strip, which normally stops the doorplate in the normal close position and is disconnected from the doorplate upon insertion of a matching memory card.

8 Claims, 9 Drawing Sheets

UNIVERSAL MEMORY CARD ADAPTER HAVING A MOVABLE DOOR

BACKGROUND OF THE INVENTION (a) Field of the Invention

The present invention relates to a memory card adapter and more particularly, to a universal memory card adapter, which has a movable door at the stepped receiving open side thereof.

(b) Description of the Prior Art

Various memory cards such as SD memory card, MMC memory card, MMC 4.0 memory card, MS memory card, XD memory card, SM memory card, mini SD memory card, RS-MMC memory card, and RS-MMC 4.0 memory card have been disclosed, and have appeared on the market. These memory cards have different sizes. There are universal memory card adapters designed to fit different memory cards.

Conventional universal memory card adapters commonly comprise a terminal holder and a metal top cover covering the terminal holder. The terminal holder holds multiple sets of terminals. Probes, read write protect plate, grounding terminals, solder pads, and etc. may be installe3d in the terminal holder subject to different requirements. The top cover defines with the front side of the terminal holder a stepped receiving open side for the insertion of one of a set of memory cards into the inside of the terminal holder. However, when inserting a small memory card, for example, a mini SD memory card into the stepped receiving open side, the mini SD memory card may be deviated from the path to touch the non-matching terminals, causing damage to the non-matching terminals.

SUMMARY OF THE INVENTION

The present invention has been accomplished under the circumstances in view. It is one object of the present invention to provide a universal memory card adapter, which has means to guide insertion of one of a set of memory cards accurately into position. It is another object of the present invention to provide a universal memory card adapter, which has means to hold down terminals for positive contact of the inserted memory card. According to one aspect of the present invention, the universal memory card adapter comprises a movable door horizontally pivotally mounted in a stepped receiving open side thereof to control insertion of different memory cards, which movable door having a doorplate pivotally mounted in the stepped receiving open side and dividing the stepped receiving open side into an open type insertion slot and a sheltered insertion slot to match the insertion of different memory cards, a spring member for holding the doorplate in a normal close position, and a control spring strip, which normally stops the doorplate in the normal close position and is disconnected from the doorplate upon insertion of a matching memory card. According to another aspect of the present invention, the doorplate has locating grooves for holding down corresponding terminals for the contact of the inserted matching memory card.

DETAILED DESCRIPTION OF THE PREFERRED EMBODIMENTS

Referring to the annexed drawings in detail, a universal memory card adapter in accordance with the present invention is shown comprised of a top cover 1, a terminal holder 2, and a movable door 3.

Figure 1:
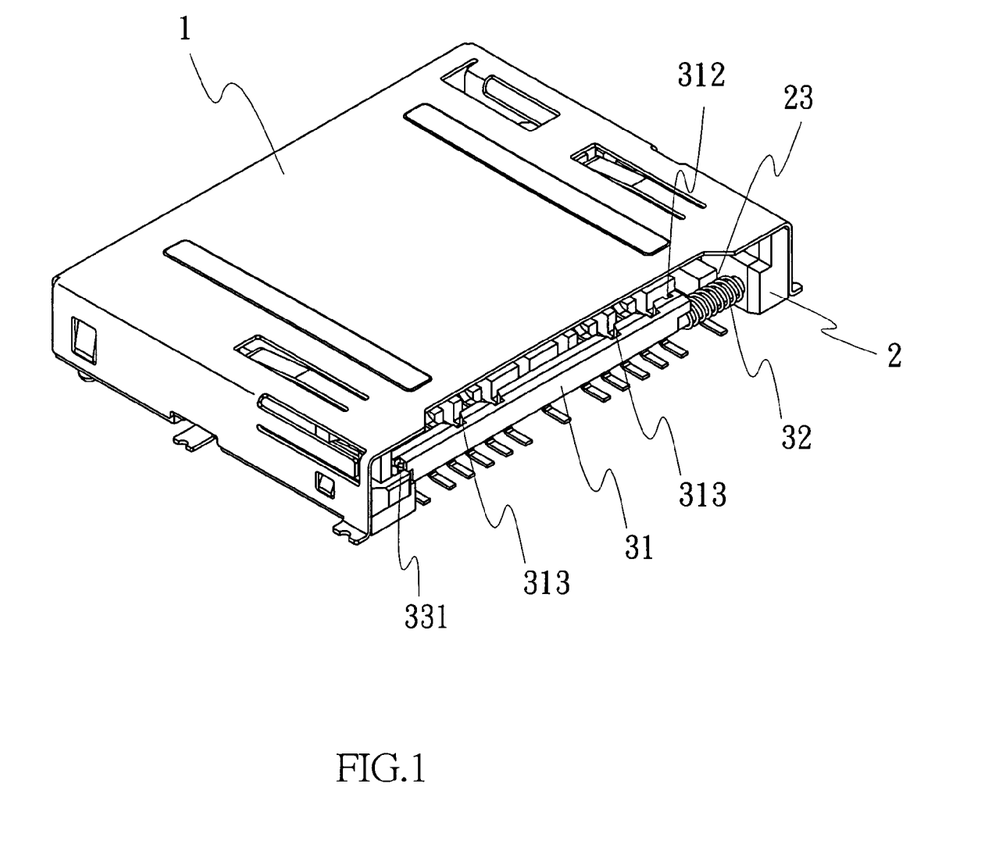
FIG. 1 is an elevational view of a universal memory card adapter according to the present invention.
Figure 2:
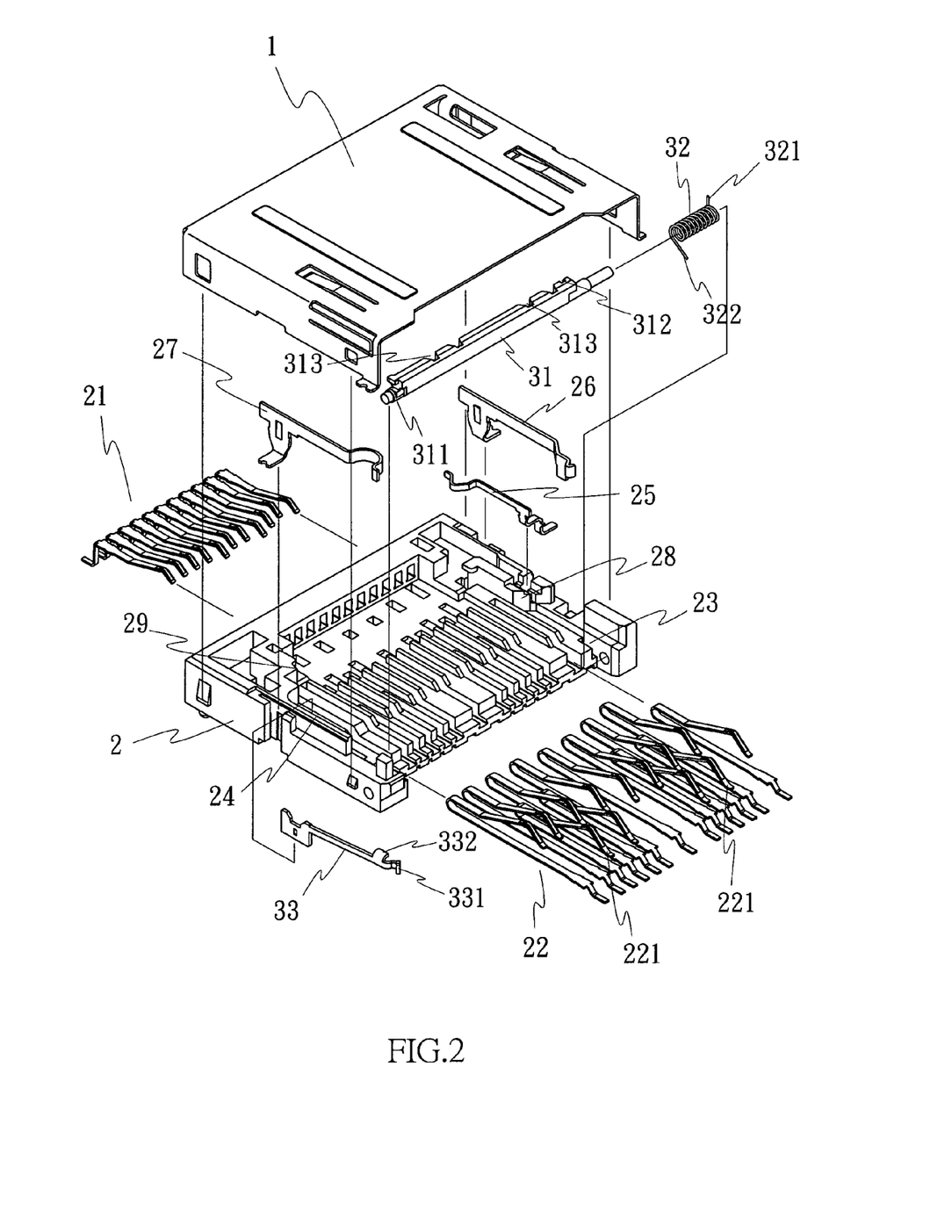
FIG. 2 is an exploded view of the universal memory card adapter according to the present invention.
Figure 3:
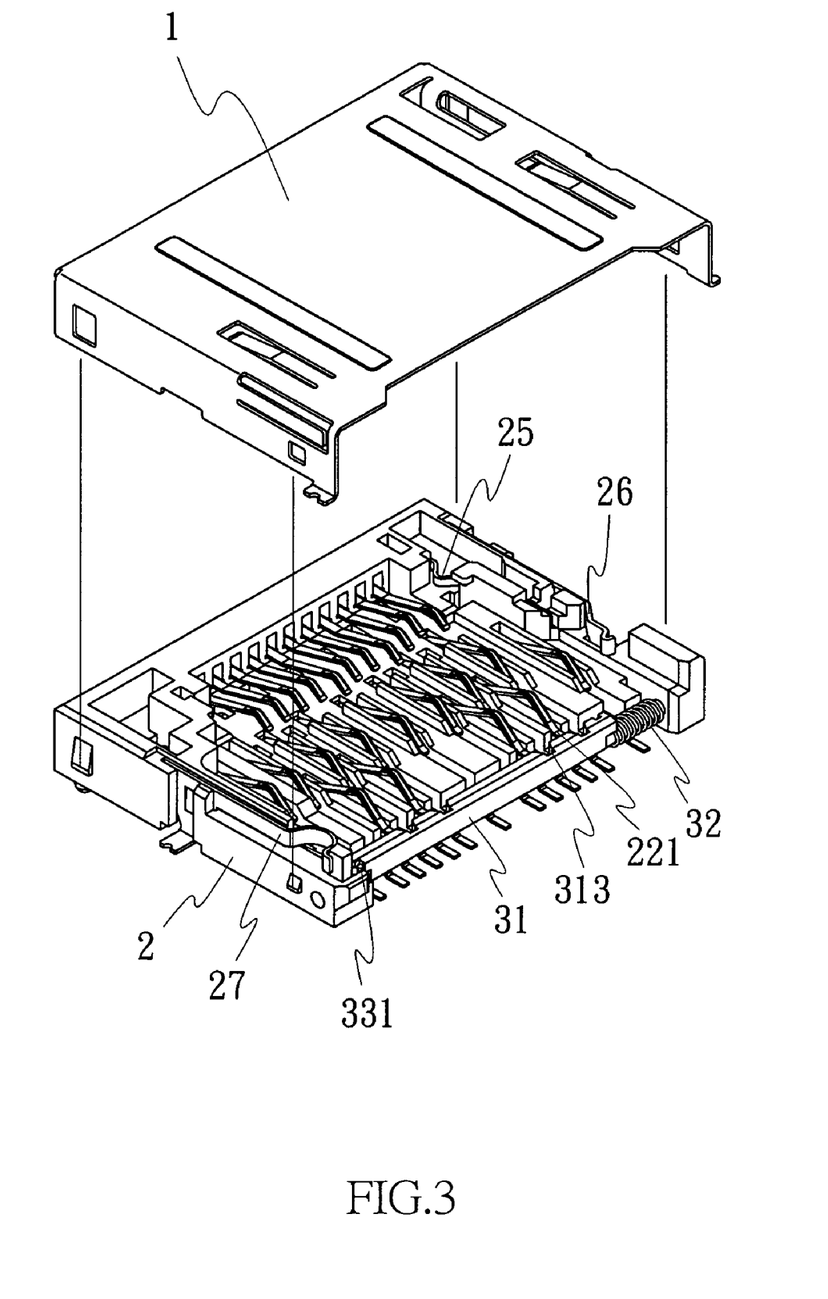
FIG. 3 is an exploded view of the present invention, showing the top cover detached from the terminal holder.
Figure 4:
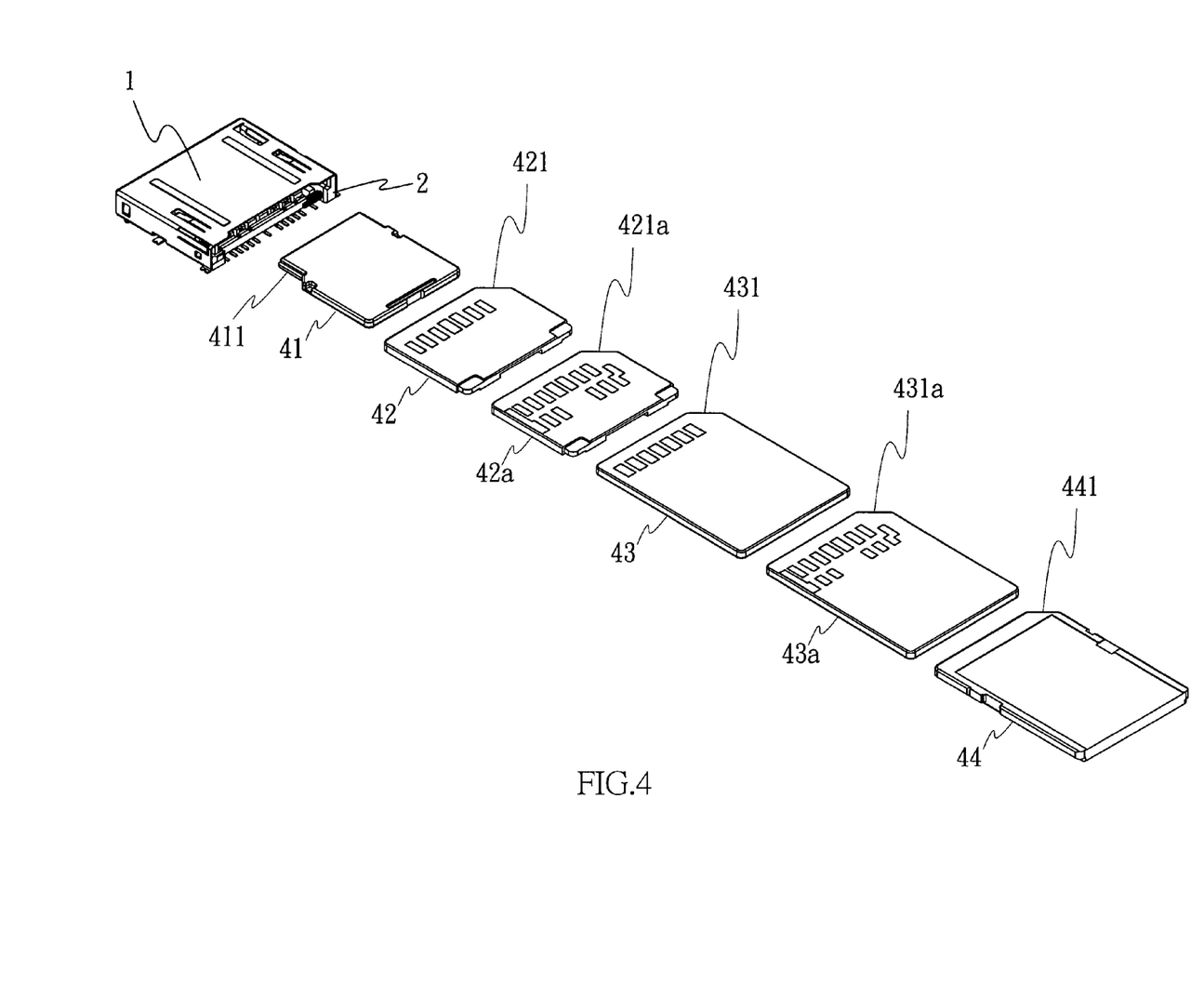
FIG. 4 is a schematic drawing showing a set of memory cards for use with the universal memory card adapter according to the present invention.

The top cover 1, as shown in FIGS. 1~3, is a metal cover plate fitting over the terminal holder 1 and forming with the terminal holder 1 the body of the memory card adapter that defines a stepped receiving open side for the insertion of any of a variety of memory cards 41, 42, 42a, 43, 43a, 44 (for example, mini SD memory card 41, RS-MMC memory card 42, RS-MMC4.0 memory card 42a, MMC memory card 43, MMC4.0 memory card 43a, SD memory card 44).

The terminal holder 2, as shown in FIG. 3, is an electrically insulative member holding multiple sets of terminals 21, 22 for the connection of different memory cards 41, 42, 42a, 43, 43a, 44 selectively. Because the arrangement and composition of the sets of terminals 21, 22 are of the known art and not within the scope of the claims of the present invention, not further detailed descriptions in this regard is necessary.

Figure 5:
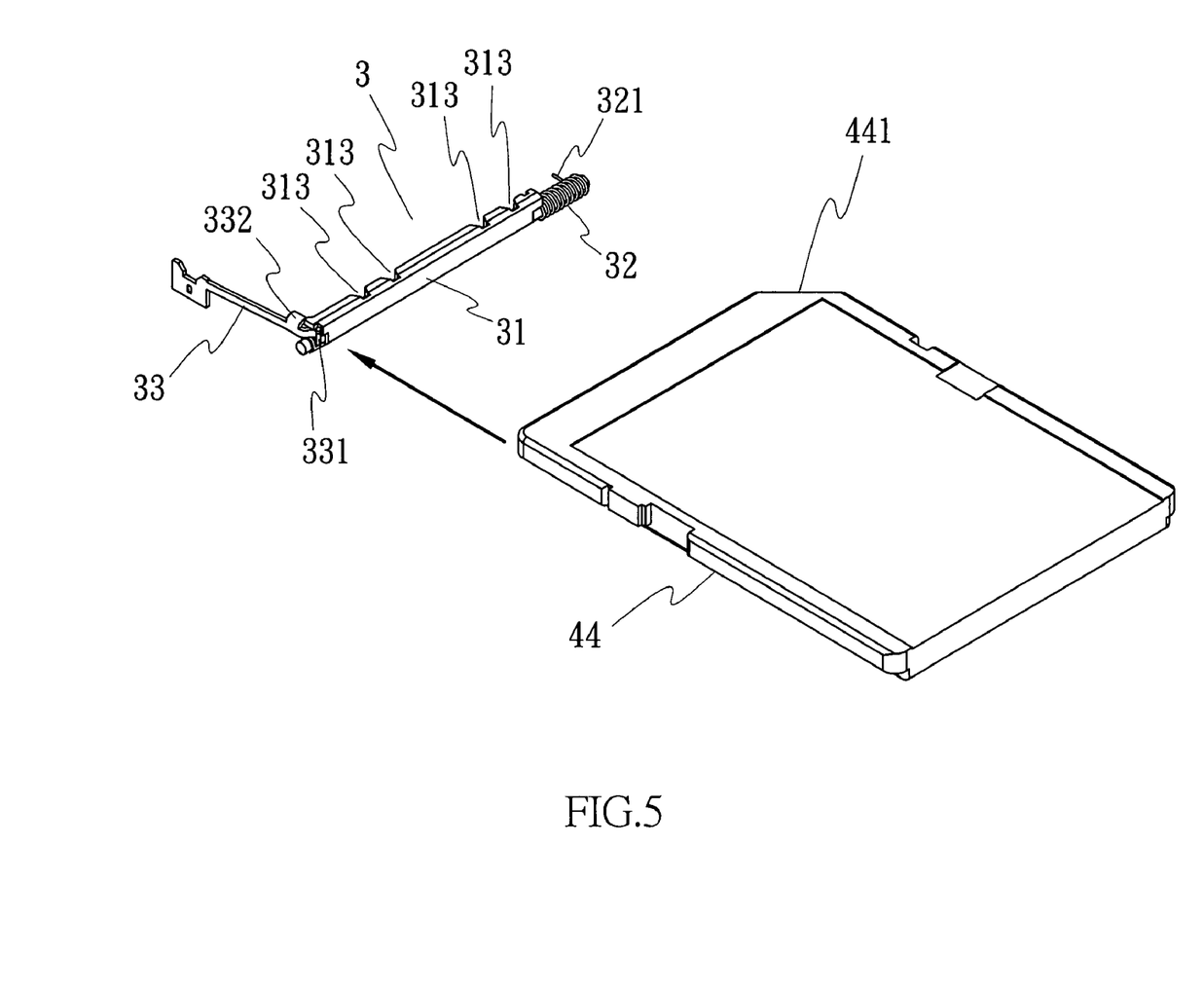
FIG. 5 is a schematic drawing showing the relationship between the movable door and a memory card according to the present invention.
Figure 6:
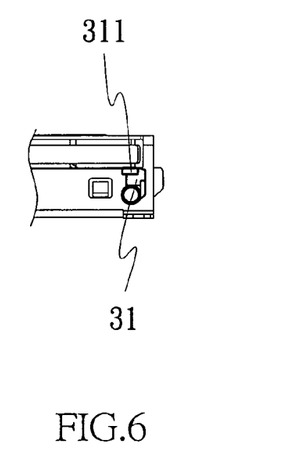
FIG. 6 is a side view in section of a part of the present invention, showing the closed status of the movable door.
Figure 7:
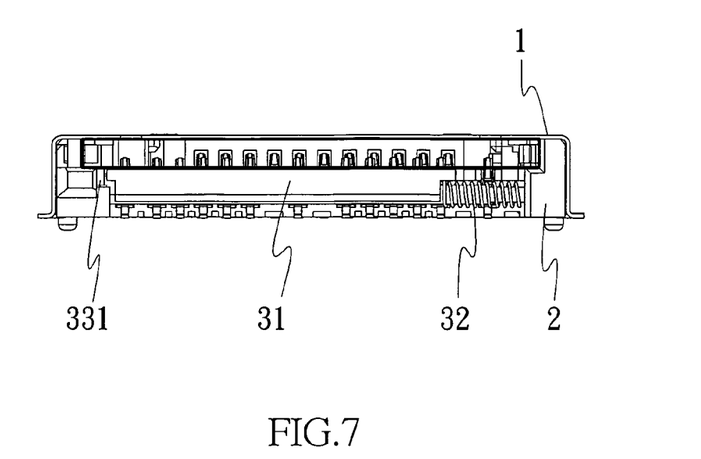
FIG. 7 is a front view of a part of the present invention, showing the closed status of the movable door.
Figure 8:
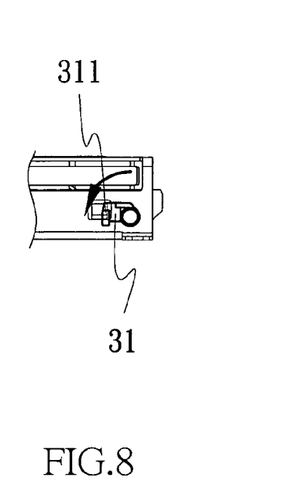
FIG. 8 is similar to FIG. 6 but showing the movable door opened.
Figure 9:
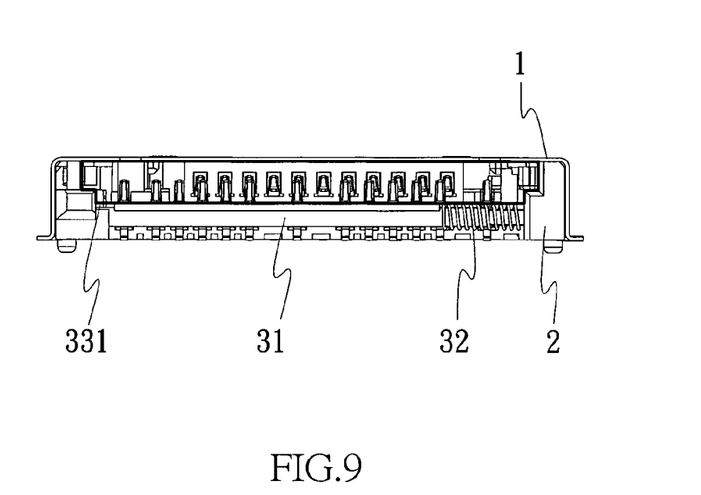
FIG. 9 is similar to FIG. 7 but showing the movable door opened.
Figure 10:
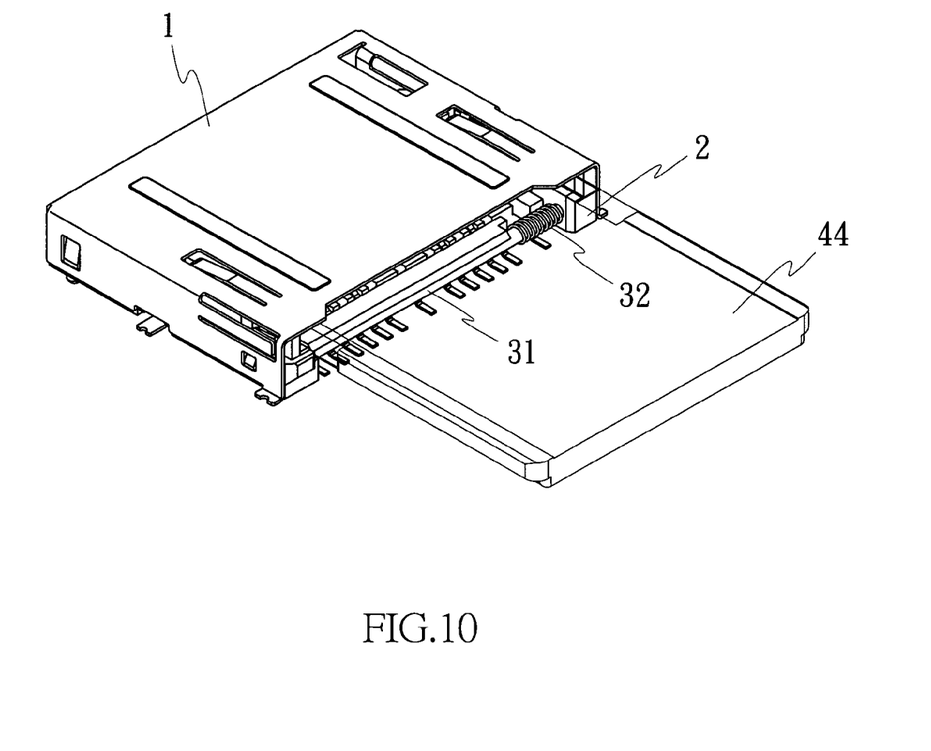
FIG. 10 is a schematic drawing showing a memory card approached the stepped receiving open side of the universal memory card adapter according to the present invention.
Figure 11:
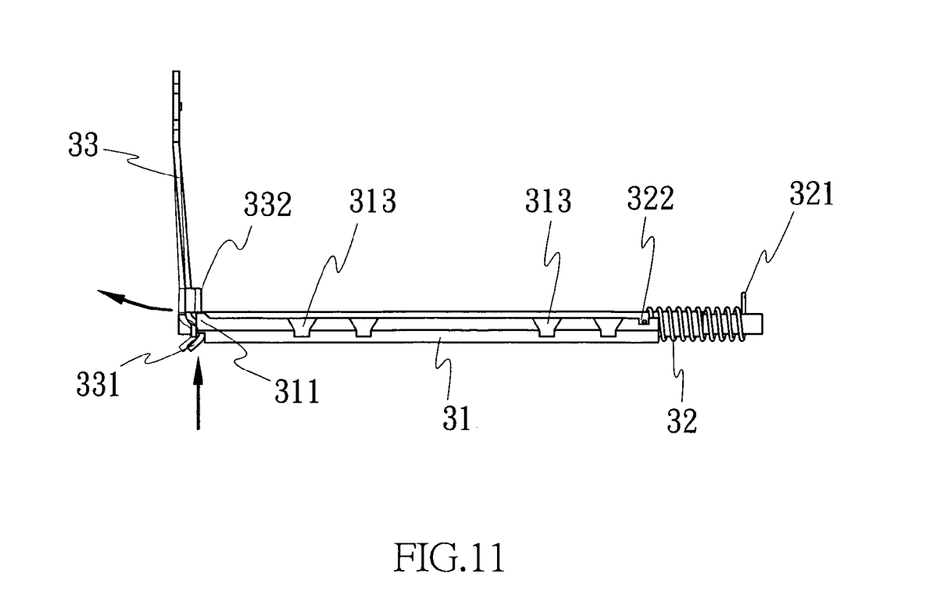
FIG. 11 is a schematic drawing showing the movable door in action.
Figure 12:
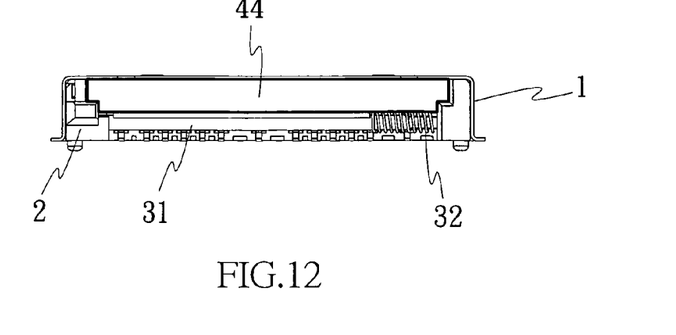
FIG. 12 is a schematic drawing showing a SD memory card inserted into the memory card adapter in position according to the present invention.

The movable door 3, as shown in FIGS. 2 and 5, is provided at the stepped receiving open side of the body of the memory card adapter, comprising a doorplate 31, a spring member 32, and a control spring strip 33. The doorplate 31 is a narrow, elongated plate member pivoted to the stepped receiving open side of the body of the memory card adapter, dividing the stepped receiving open side of the body of the memory card adapter an open-type insertion slot and a sheltered insertion slot. The doorplate 31 has a retaining portion 311, a locating notch 312, and a plurality of locating grooves 313. The spring member 32 according to this embodiment is a torsional spring mounted on one end of the doorplate 31, having one end 321 fastened to a locating hole 23 at one lateral side of the terminal holder 2 and the other end 322 fastened to the locating notch 312 of the doorplate 31. The spring member 32 holds the doorplate 31 in the close position (see FIG. 1). The control spring strip 33 is fastened to a locating hole 24 at the other lateral side of the terminal holder 2, having a curved front tip 331 and a butt 332 adjacent to the curved front tip 331. Normally, the butt 332 is maintained engaged with the retaining portion 311 of the doorplate 31 (see FIGS. 6 and 7). When inserting a corresponding memory card 44 into the sheltered insertion hole (see FIGS. 8~11), the memory card 44 pushes curved front tip 331 of the control spring strip 33 to disengage the butt 332 from the retaining portion 311 of the doorplate 31 (see FIGS. 10 and 11), allowing the spring member 32 to bias the doorplate 31 from the close position to the open position (see FIGS. 8 and 10), and therefore the memory card 44 can be inserted into position (see FIG. 12).

When the doorplate 31, the spring member 32 and the control spring strip 33 are assembled, the movable door 3 is pivotally mounted in the stepped receiving open side of the body of the memory card adapter, dividing the stepped receiving into an open type insertion slot and a sheltered insertion slot. Therefore, the open type insertion slot and the sheltered insertion slot automatically correct memory card insertion direction, preventing improper insertion of a mini memory card into the memory card adapter in a wrong direction or touching of the inserted memory card with terminals in the terminal holder 2 erroneously. Therefore, the service life of the memory card adapter can greatly be prolonged.

The terminal holder 2 may be provided with probes 25, 26, read write protect plate 27, or grounding terminals or solder pads (not shown) when desired. The probes 25, 26 are for signal connection upon insertion of a respective type of memory card.

As indicated above, the doorplate 31 of the movable door 3 has a plurality of locating grooves 313. When inserting a memory card 44 into the sheltered insertion slot of the stepped receiving open side of the body of the memory card adapter, the memory card 44 pushes open the doorplate 31, keeping the locating grooves 313 pressed on the contact portions 221 of the corresponding terminals 22 for positive contact with respective contacts of the inserted memory card 44.

Figure 13:
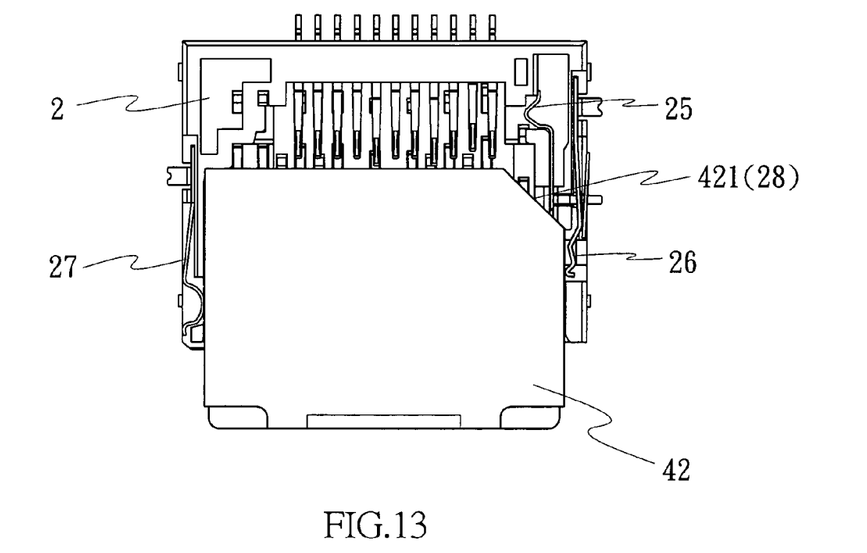
FIG. 13 is a schematic drawing showing a RS-MMC memory card inserted into the universal memory card adapter in position according to the present invention.
Figure 14:
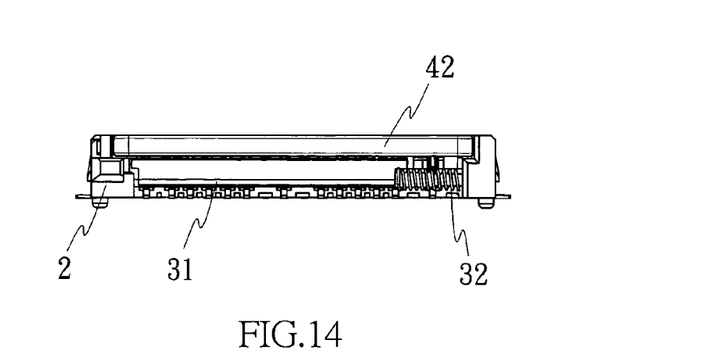
FIG. 14 is a front view of FIG. 12.
Figure 15:
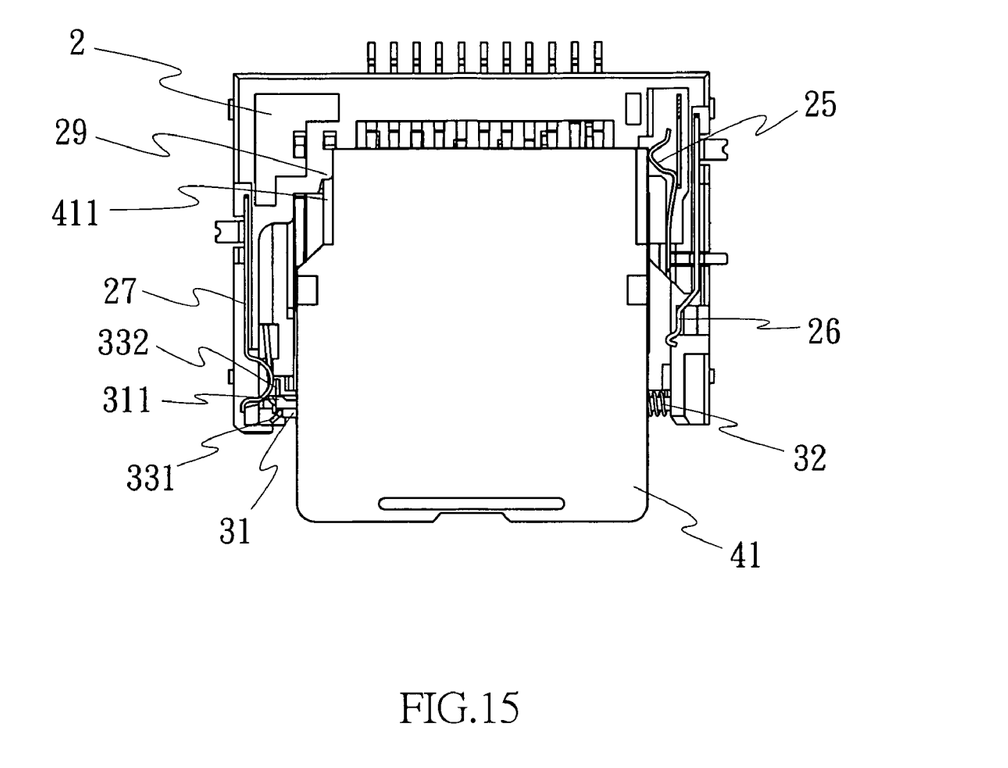
FIG. 15 is a schematic drawing showing a mini SD memory card inserted into the universal memory card adapter in position according to the present invention.
Figure 16:
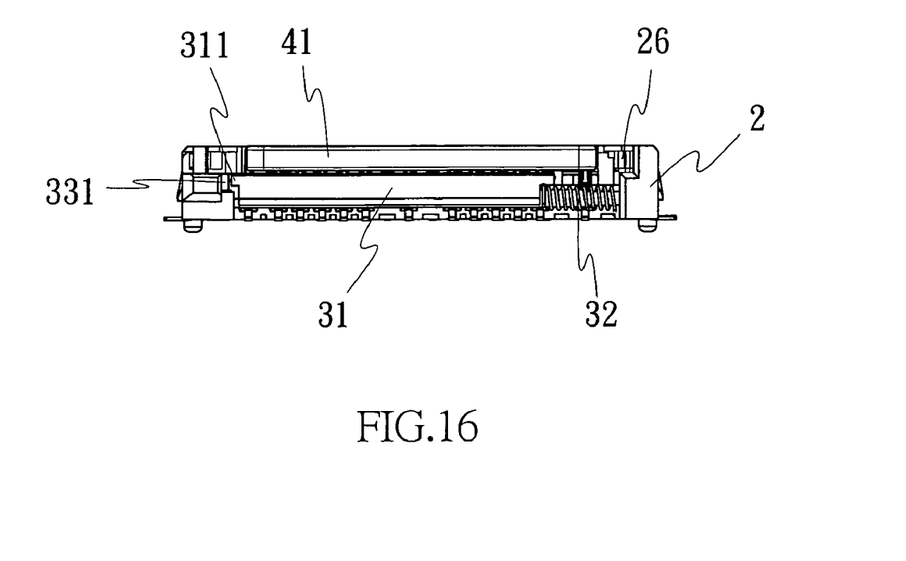
FIG. 16 is a front view of FIG. 15.

Referring to FIGS. 13 and 14, when inserting a RS-MMC memory card 42 (or RS-MMC 4.0 memory card 42a) into the open type insertion slot of the stepped receiving open side of the body of the memory card adapter, the movable door 3 works as guide means to guide the inserting RS-MMC memory card 42 (or RS-MMC 4.0 memory card 42a) into position without deviation from the path. Similarly, when inserting a mini SD memory card 41 into the open type insertion slot of the stepped receiving open side of the body of the memory card adapter as shown in FIGS. 15 and 16, the movable door 3 works as guide means to guide the inserting mini SD memory card 41 into position without deviation from the path.

Referring to FIG. 2, the terminal holder 2 has a beveled block 28 that matches the beveled edge 421, 421a, 431, 431a, 441 of a RS-MMC memory card 42, RS-MMC 4.0 memory card 42a, MMC memory card 43, MMC 4.0 memory card 43a, or SD memory card 44, ensure accurate insertion of the inserting memory card 42, 42a, 43, 43a, or 44 into position. The terminal holder 2 further has a protruding block 29 at one side opposite to the beveled block 28 that matches the notch 411 of a mini SD memory card 41, ensuring accurate insertion of the inserting mini SD memory card 41 into position.

This embodiment shows only one application example of the present invention for use with mini SD memory card 41, RS-MMC memory card 42, RS-MMC 4.0 memory card 42a, MMC memory card 43, MMC 4.0 memory card 43a, or SD memory card 44.

Although a particular embodiment of the invention has been described in detail for purposes of illustration, various modifications and enhancements may be made without departing from the spirit and scope of the invention.

What is claimed is:

1. A universal memory card adapter comprising a terminal holder, multiple sets of terminals mounted in said terminal holder for connection with one of a series of memory cards, and a top cover covering said terminal holder and defining with said terminal holder a stepped receiving opening side for the insertion of one of said series of memory cards into said terminal holder to contact one of said multiple sets of terminals,
wherein a movable door is horizontally pivotally mounted in said adapter holder, dividing said stepped receiving open side into an open type insertion slot and a sheltered insertion slot for the insertion of said series of memory cards selectively, said movable door comprising
a doorplate pivotally mounted in said stepped receiving open side and dividing said stepped receiving open side into said open type insertion slot and said sheltered insertion slot, said doorplate having a retaining portion at one end thereof;
a spring member mounted on one end of said door plate and connected between said doorplate and said terminal holder to hold said doorplate in a normally closed position for enabling said doorplate to be turned from said normally closed position to an open position upon insertion of one of said series of memory card; and
a control spring strip fastened to one side of said terminal holder, said control spring strip having a curved front tip and a butt, said butt being engaged with the retaining portion of said doorplate to hold said doorplate in said normally closed position, said curved front tip being configured for pushing by an inserting memory card into said sheltered insertion slot to force said butt away from the retaining portion of said doorplate for enabling said doorplate to be turned from said normally closed position to said open position by the inserting memory card for allowing the inserting memory card to be inserted into said terminal holder and set into contact with one of said multiple sets of terminals electrically.

2. The universal memory card adapter as claimed in claim 1, wherein said doorplate has a narrow elongated shape.

3. The universal memory card adapter as claimed in claim 1, wherein said doorplate has a plurality of locating grooves for holding down a predetermined number of said terminals.

4. The universal memory card adapter as claimed in claim 1, wherein said spring member is a torsional spring, having one end fastened to a locating hole at one lateral side of said terminal holder and an opposite end fastened to a locating notch at said doorplate.

5. The universal memory card adapter as claimed in claim 1, wherein said terminal holder is selectively mounted with at least one of probes, read write protect plate, grounding terminals and solder pads.

6. The universal memory card adapter as claimed in claim 1, wherein said terminal holder comprises a beveled block fitting at least one of said series of memory cards.

7. The universal memory card adapter as claimed in claim 1, wherein said terminal holder comprises a protruding block fitting at least one of said series of memory cards.

8. The universal memory card adapter as claimed in claim 1, wherein said series of memory cards include mini SD memory card, RS-MMC memory card, RS-MMC 4.0 memory card, MMC memory card, MMC 4.0 memory card, and SD memory card.

* * * * *